Aug. 5, 1952     E. J. KAISER     2,605,655
BORING CUTTER
Filed Sept. 21, 1948
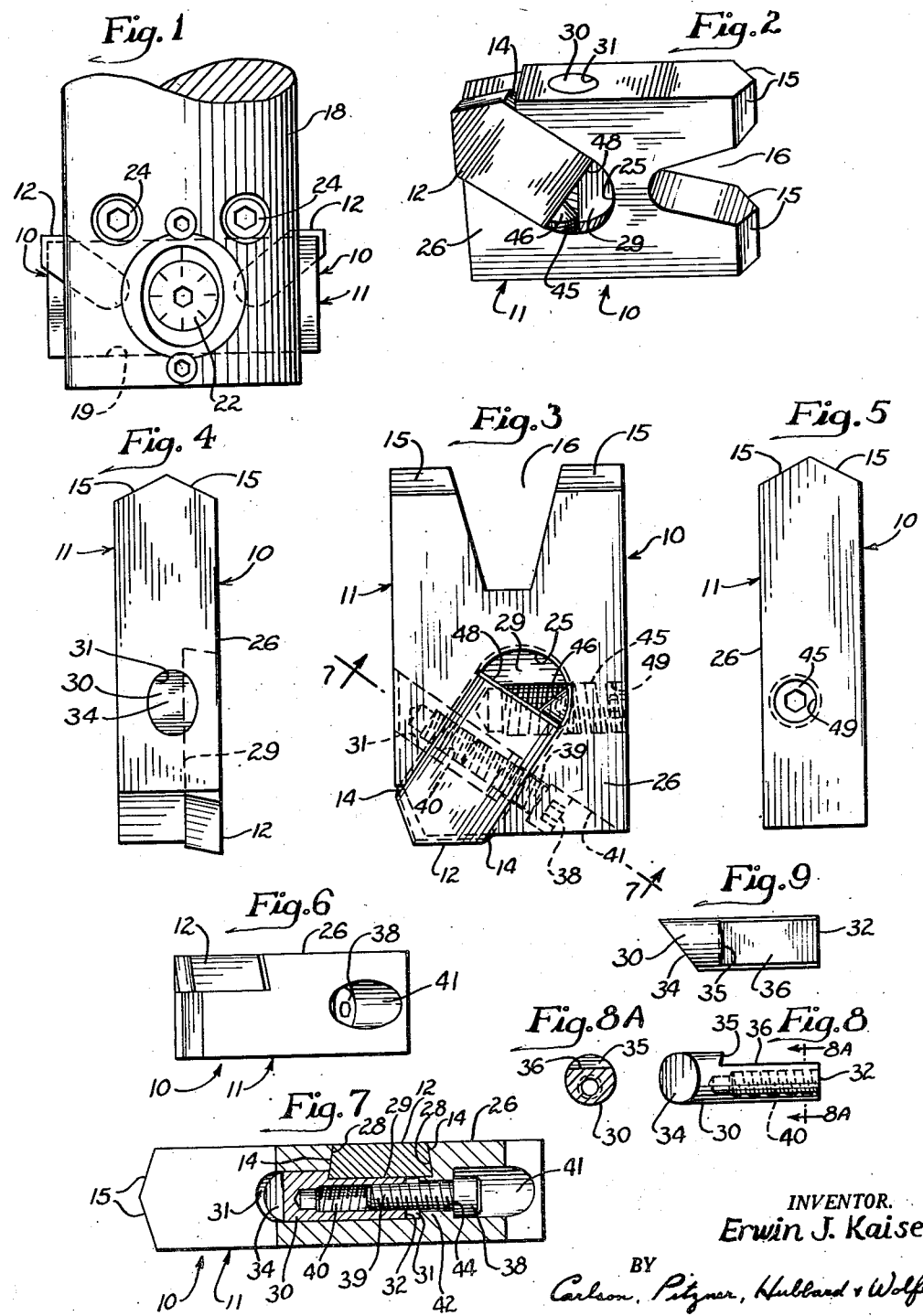
INVENTOR.
Erwin J. Kaiser
BY
Carlson, Pitzner, Hubbard & Wolfe
Attys.

Patented Aug. 5, 1952

2,605,655

UNITED STATES PATENT OFFICE 2,605,655

BORING CUTTER

Erwin J. Kaiser, Fond du Lac, Wis., assignor to Giddings & Lewis Machine Tool Company, Fond du Lac, Wis., a company of Wisconsin Application September 21, 1948, Serial No. 50,315

1 Claim. (Cl. 77—58)

The present invention pertains generally to cutting tools and more particularly to a boring cutter having a cutting tip of cemented carbide or the like. The use of high-speed cutting tips of carbide material frequently presents serious practical difficulties with regard to their mounting. One widely accepted expedient involves brazing the cutting tip to a block or holder of steel. Due to the differential expansion rate between the steel and the material in the tip, there is a tendency for excessive temperature stresses to occur in the tool, thereby limiting its life and also its effectiveness. Another mounting expedient which is particularly well suited for use in large tool sizes involves clamping the cutting tip to the holder by means of mechanical pressure. Arrangements of this type overcome the disadvantages inherent in brazing the tips to their holders but are not always satisfactory in practice due, for example, to the application of high localized clamping stresses which are apt to result in tool breakage.

One object of the invention is to provide a boring cutter having a novel and improved arrangement for mechanically holding a high-speed cutting tip of carbide or the like.

Another object is to provide a cutter of the character set forth and wherein the blade can be changed quickly so as to minimize the downtime of the machine.

A further object is to provide a cutter of the above type and which will be simple, rugged, and susceptible of economical manufacture.

Other objects and advantages will become apparent as the following detailed description proceeds, taken in connection with the accompanying drawings wherein:

Figure 1 is a side elevation of an illustrative boring bar having a pair of cutters embodying the present invention.

Fig. 2 is an enlarged perspective view of an illustrative cutter embodying the invention.

Fig. 3 is a front elevation of the cutter shown in Fig. 2.

Figs. 4 to 6 are respectively left-hand, right-hand, and bottom end views of the cutter in Fig. 3.

Fig. 7 is an enlarged transverse sectional view through the cutter of Fig. 3, such view being taken in the plane of the line 7—7.

Fig. 8 is an enlarged side view detailing the clamping plunger per se.

Fig. 8A is a transverse sectional view through the plunger of Fig. 8, taken in the plane of the line 8A—8A.

Fig. 9 is a plan view of the plunger shown in Fig. 8.

While the invention is susceptible of various modifications and alternate constructions, a preferred embodiment has been shown in the drawings and will be herein described in considerable detail. It should be understood, however, that there is no intention to limit the invention to the specific form disclosed but, on the contrary, the intention is to cover all modifications and alternative constructions falling within the spirit and scope of the invention as expressed in the appended claim.

Referring more specifically to the drawings, the invention is there shown embodied in an illustrative boring cutter 10 comprising a generally rectangular cutter block 11 and a hardened cutting blade 12 of cemented carbide or the like. In the present instance, the latter has a substantially uniform trapezoidal cross section throughout its length, being formed with mutually inclined lateral edge surfaces 14. On the end away from the blade 12, the block 11 is fashioned with two sets of wedge bearing surfaces 15 separated by a relatively wide U-shaped notch 16.

In practice, a pair of the cutters 10 may be operatively supported in a boring bar 18 (Fig. 1) having a transverse tool slot 19. The latter is of appropriate size to slidably receive the cutters 10 which are mounted in end-to-end relation therein with their bearing surfaces 15 facing inwardly. To permit radial adjustment of the cutters 10, the boring bar 18 may be formed with a diametrical bore (not shown) intersecting the slot 19 at 90 degrees and housing an expansion wedge (not shown) together with a micrometer adjusting screw 22. The wedge has inclined surfaces which cooperate with the surfaces 15 to expand the cutter radially of the bar 18. Eccentric clamping screws 24 may also be used with the bar 18 to secure the cutters in place after proper adjustments have been made.

To receive the blade 12, the cutter block 11 (Figs. 2, 3 and 7) is formed with a relatively wide diagonal slot 25 in one of its larger side faces 26, such slot starting adjacent the central portion of the face 26 and terminating at the tool supporting end and an adjacent lateral edge face of the block, or in other words, at one of the corners thereof located away from the wedge bearing surfaces 15. Side walls 28 of the slot 25 are undercut at an angle substantially equal to the inclination of the blade edges 14, making an acute angle with the face 26 and also with slot floor 29 which is generally parallel to the face 26. The slot 25 is suitably dimensioned to accommodate the blade 12 in telescoping relation with a sort of sliding dovetail fit, permitting the blade to move longitudinally thereof but constraining it against movement in any other direction.

Provision is made for adjustably clamping the blade 12 against longitudinal movement within the slot 25 without the use of wedge members and without applying undue concentrations of localized clamping stress to the blade. This is accomplished in the present instance by the use of a clamping plunger 30 (Figs. 7 to 9) slidably housed within a transverse bore 31 disposed at about 90 degrees to the longitudinal axis of the slot 25 and intersected along a portion of its length by the plane of the slot floor 29 as best shown in Figures 4 and 7 of the accompanying drawings. The plunger 30 comprises a generally cylindrical body having a squared-off inner end 32 and an angular outer end 34. Running longitudinally of the plunger 30 from its inner end 32 and terminating at an undercut shoulder 35 is a relatively wide flat 36. The latter, being approximately coplanar with the slot floor 29 when the plunger is installed in the bore 31, underlies the blade 12 transversely. By the same token, the shoulder 35, being undercut at about the same angle as the side walls 28 of the slot, is conveniently arranged to engage the adjacent blade edge 14 with which it is complementary.

Operatively associated with the clamping plunger 30 for actuating the same is a drawscrew 38 having a threaded shank 39 which engages a tapped hole 40 running longitudinally of the plunger. The head of the screw 38 is located within a counterbore 41 in the block 11 arranged in substantial alinement with the bore 31. Interposed between the latter and the counterbore 41 is an annular shoulder 42 having an axial hole 44 which connects the bore 31 and the counterbore 41 and is of slightly greater diameter than the screw shank 39. With such arrangement, the shoulder 42 constitutes a firm anchorage for the head of the screw 38. Thus tightening of the latter will tend to draw the plunger 30 toward the shoulder 42 and at the same time the undercut shoulder 35 of the plunger will accost the adjacent edge 14 of the blade 12. This, in turn, will result in urging the blade 12 and its opposite edge laterally and into tight frictional engagement with the remote side wall 28 of the slot 25.

Located adjacent the rearward end of the slot 25 is an adjustable stop means for defining the position of the blade in the slot prior to clamping the former, such position being one wherein the cutting edge of the blade overhangs the tool supporting end of the block by a relatively slight margin. In the present instance, such means comprises a screw 45 having a conical tip 46 adapted to bear against squared end 48 of the blade 12. The screw 45 is mounted in a tapped hole 49 which starts at the right hand edge of the block 11 (Figs. 3 and 5) and intersects the slot 25, terminating in the vicinity of the longitudinal axis of the latter. The hole 49 is preferably given the necessary angular relation to such axis to obtain line bearing contact between the conical tip 46 and the end 48 of the blade 12.

It can now be appreciated by those skilled in the art that the blade mounting arrangement just described possesses a number of advantages. Not only is the clamping stress distributed throughout the major portion of the blade and in the direction wherein the blade has its maximum compressive strength but, what is equally important, the cutting pressure on the blade has a large component in the same direction as the clamping stress, thus tending to decrease the stress on the clamp during operation. Moreover, the wedgeless clamping action permits rapid replacement of a blade immediately after the simple operation of loosening the drawscrew 38. In addition, the convenient location of the screw 38 renders the same readily accessible from the outermost end of the block 11 without moving the cutter 10 or otherwise disturbing the setup of the boring tool in which the same may be used. This tends to minimize the downtime of the machine incident to changing blades. The foregoing mounting arrangement also avoids undue temperature stresses during cutting operations because the blade 12 is left free to expand or contract relative to the block 11. Economy of manufacture is assured by reason of the simplicity of the component parts.

I claim as my invention:

A boring cutter comprising the combination of a generally rectangular cutter block having a tool supporting end and a substantially diagonal slot in one side face thereof terminating at said tool supporting end and an adjacent lateral edge face of said block, each lateral side wall of said slot being undercut and the floor of said slot being parallel to said side face of said block, said block also having a bore and an alined counterbore running perpendicular to the longitudinal axis of the slot but being parallel with the floor thereof, the bore being intersected along a portion of its length by the plane of the slot floor, the counterbore being formed in said tool supporting end of said block, an annular shoulder interposed between the bore and the counterbore, a cutter blade telescopically housed within the diagonal slot with its cutting edge projecting from said tool supporting end and from said lateral edge face by a relatively slight margin, said cutter blade being of trapezoidal cross section, a clamping plunger slidably disposed within said bore and having a relatively wide flat coplanar with said slot floor and underlying the blade transversely when said plunger is installed in said bore, said flat terminating at its inner end in an upstanding, undercut shoulder arranged in complemental abutting engagement with the lateral edge of said blade remote from said annular shoulder for the application of clamping force to said blade parallel to the floor of said slot, and a drawscrew threaded into said plunger and having a head disposed in bearing engagement with said annular shoulder, said drawscrew head being freely accessible from said tool supporting end of said cutter block.

ERWIN J. KAISER.

REFERENCES CITED

The following references are of record in the file of this patent:

UNITED STATES PATENTS

| Number | Name | Date |
| --- | --- | --- |
| 1,746,381 | Davis | Feb. 11, 1930 |
| 2,076,663 | Miller | Apr. 13, 1937 |
| 2,197,162 | Smith | Apr. 16, 1940 |